United States Patent
Zhao et al.

(10) Patent No.: US 12,455,237 B2
(45) Date of Patent: Oct. 28, 2025

(54) METHOD, DEVICE AND SYSTEM FOR OPTICAL PROPERTY MEASUREMENT BASED ON SPATIAL FREQUENCY DOMAIN IMAGING

(71) Applicant: Beihang University, Beijing (CN)

(72) Inventors: Yanyu Zhao, Beijing (CN); Yubo Fan, Beijing (CN)

(73) Assignee: Beihang University, Beijing (CN)

( * ) Notice: Subject to any disclaimer, the term of this patent is extended or adjusted under 35 U.S.C. 154(b) by 350 days.

(21) Appl. No.: 18/131,346

(22) Filed: Apr. 5, 2023

(65) Prior Publication Data

US 2023/0243745 A1 Aug. 3, 2023

Related U.S. Application Data

(63) Continuation of application No. PCT/CN2022/077840, filed on Feb. 25, 2022.

(30) Foreign Application Priority Data

Mar. 22, 2021 (CN) .......................... 202110304223.7

(51) Int. Cl.
*G01N 21/47* (2006.01)
*G01N 21/17* (2006.01)
*G01N 21/49* (2006.01)

(52) U.S. Cl.
CPC ..... *G01N 21/4795* (2013.01); *G01N 21/1717* (2013.01); *G01N 21/49* (2013.01); *G01N 2021/1725* (2013.01)

(58) Field of Classification Search
CPC ........... G01N 21/4795; G01N 21/1717; G01N 21/49; G01N 2021/1725; G01B 11/25
See application file for complete search history.

(56) References Cited

U.S. PATENT DOCUMENTS

| 6,252,531 B1 | 6/2001 | Gordon et al. |
| 7,863,552 B2 * | 1/2011 | Cartlidge ............... G06T 3/10 |
| | | 359/368 |

(Continued)

FOREIGN PATENT DOCUMENTS

| CN | 101743466 A | 6/2010 |
| CN | 104981842 A | 10/2015 |

(Continued)

OTHER PUBLICATIONS

English machine translation of CN105866035A (Year: 2016).*

*Primary Examiner* — Dominic J Bologna
(74) *Attorney, Agent, or Firm* — NZ Carr Law Office PLLC (57) ABSTRACT

A method for optical property measurement based on spatial frequency domain imaging, includes: obtaining a first target sinusoidal light pattern with a specified spatial frequency by modulating first light emitted by a light source in a spatial frequency domain, the number of coded bits of the first target sinusoidal light pattern is smaller than a preset number of bits; irradiating the first target sinusoidal light pattern to a surface of a sample to be detected; collecting light intensity distribution data of second light, the second light is formed after the first target sinusoidal light pattern is reflected by the sample to be detected; determining one or more optical property parameters of the sample to be detected according to the light intensity distribution data of the second light.

7 Claims, 4 Drawing Sheets

(56) References Cited

U.S. PATENT DOCUMENTS

| | | | |
|---|---|---|---|
| 2004/0227822 A1 | 11/2004 | Cartlidge et al. | |
| 2008/0101657 A1 | 5/2008 | Durkin et al. | |
| 2010/0188660 A1 | 7/2010 | Palumbo | |
| 2014/0128744 A1* | 5/2014 | Cuccia | A61B 5/0077 600/476 |
| 2015/0176968 A1 | 6/2015 | Alfano et al. | |
| 2015/0249496 A1* | 9/2015 | Muijs | H04B 10/116 398/118 |
| 2016/0300348 A1* | 10/2016 | Nadeau | G06T 7/50 |
| 2016/0309068 A1* | 10/2016 | Nadeau | A61B 1/043 |
| 2018/0324394 A1 | 11/2018 | Xu et al. | |

FOREIGN PATENT DOCUMENTS

| | | | |
|---|---|---|---|
| CN | 105466889 A | 4/2016 | |
| CN | 105510253 A | 4/2016 | |
| CN | 105519109 A | 4/2016 | |
| CN | 105866035 A * | 8/2016 | G01N 21/17 |
| CN | 107121682 A | 9/2017 | |
| CN | 107607040 A | 1/2018 | |
| CN | 110095081 A | 8/2019 | |
| CN | 112099223 A | 12/2020 | |
| CN | 114018819 A | 2/2022 | |
| IN | 104135629 A | 11/2014 | |
| WO | 2017166082 A1 | 10/2017 | |
| WO | 2021009017 A1 | 1/2021 | |

* cited by examiner

METHOD, DEVICE AND SYSTEM FOR OPTICAL PROPERTY MEASUREMENT BASED ON SPATIAL FREQUENCY DOMAIN IMAGING

CROSS REFERENCE TO RELATED APPLICATIONS

The present application is a continuation of International Patent Application No. PCT/CN2022/077840 filed on Feb. 25, 2022, which claims the benefit of priority from Chinese Patent Application No. 202110304223.7 titled "METHOD, DEVICE AND SYSTEM FOR OPTICAL PROPERTY MEASUREMENT BASED ON SPATIAL FREQUENCY DOMAIN IMAGING" and filed with the China National Intellectual Property Administration on Mar. 22, 2021, the entire content of each is incorporated herein by reference.

TECHNICAL FIELD

The application relates to the field of optical technology, in particular to a method, device and system for optical property measurement based on spatial frequency domain imaging.

BACKGROUND

Spatial Frequency Domain Imaging (SFDI) technology is a new non-contact optical imaging technology, which uses light emitted by a spatially modulated light source instead of a temporally modulated light source to form structured light with specified spatial frequency, and uses the response of objects (such as biological tissues, fruits, gases, scattering media, etc.) with optical absorption and scattering properties to the structured light, in order to measure the optical properties of the objects.

At present, when using spatial frequency domain imaging to measure optical properties, due to the limitation of measurement hardware, the measurement speed is slow and not ideal. Therefore, it is urgent to have a solution that can quickly carry out spatial frequency domain imaging measurement.

SUMMARY

The purpose of some embodiments of the application is to provide a method, device and system for optical property measurement based on spatial frequency domain imaging, so as to improve the measurement speed of spatial frequency domain imaging.

In order to solve the above technical problem, the embodiments of the application adopt the following technical solutions.

In a first aspect, a method for optical property measurement based on spatial frequency domain imaging is proposed, comprising:

obtaining a first target sinusoidal light pattern with a specified spatial frequency by modulating first light emitted by a light source in a spatial frequency domain, the number of coded bits of the first target sinusoidal light pattern is smaller than a preset number of bits;

irradiating the first target sinusoidal light pattern to a surface of a sample to be detected;

collecting light intensity distribution data of second light, the second light is formed after the first target sinusoidal light pattern is reflected by the sample to be detected;

determining one or more optical property parameters of the sample to be detected according to the light intensity distribution data of the second light.

In the second aspect, a device for optical property measurement based on spatial frequency domain imaging is proposed, comprising:

a first modulating module, configured to obtain a first target sinusoidal light pattern with a specified spatial frequency by modulating first light emitted by a light source in a spatial frequency domain, the number of coded bits of the first target sinusoidal light pattern is smaller than a preset number of bits;

a first irradiating control module, configured to irradiate the first target sinusoidal light pattern to a surface of a sample to be detected;

a first data collecting module, configured to collect light intensity distribution data of second light, the second light is formed after the first target sinusoidal light pattern is reflected by the sample to be detected;

a determining module, configured to determine one or more optical property parameters of the sample to be detected according to the light intensity distribution data of the second light.

In a third aspect, a device for optical property measurement based on spatial frequency domain imaging is proposed, comprising: a storage and a processor electrically connected with the storage, the storage stores a computer program that can be run on the processer, the computer program, when executed by the processor, performs the steps of the method described above in the first aspect.

In a fourth aspect, a system for optical property measurement based on spatial frequency domain imaging is proposed, comprising a light source, configured to emit light;

an optical modulation device, configured to obtain a first target sinusoidal light pattern with a specified spatial frequency by modulating first light emitted by the light source in a spatial frequency domain, and to irradiate the first target sinusoidal light pattern to a surface of a sample to be detected, the number of coded bits of the first target sinusoidal light pattern is smaller than a preset number of bits;

an imaging detection device, configured to collect light intensity distribution data of second light, the second light is formed after the first target sinusoidal light pattern is reflected by the sample to be detected;

a control device, respectively connected with the optical modulation device and the imaging detection device, configured to control the operation of the optical modulation device and the imaging detection device, and to determine one or more optical property parameters of the sample to be detected according to the light intensity distribution data of the second light.

At least one of the above technical solutions adopted in the embodiments of the application can achieve the following beneficial effects.

By obtaining a first target sinusoidal light pattern with a specified spatial frequency by modulating first light emitted by a light source in a spatial frequency domain, irradiating the first target sinusoidal light pattern to a surface of a sample to be detected, determining one or more optical property parameters of the sample to be detected by collecting light intensity distribution data of second light formed by reflection of the surface of the sample to be detected, compared with square wave pattern, the application is applicable to both high frequency spatial frequency measurement and low frequency spatial frequency measurement, and has a wider scope of application. In addition, the number of coded bits of the first target sinusoidal light pattern is smaller than the preset number of bits, which can improve the optical modulation speed, thereby effectively improve the measurement speed and rapidly improve the analysis efficiency of the sample to be detected.

BRIEF DESCRIPTION OF DRAWINGS

The drawings illustrated here are used to provide a further understanding of the application and form a part of the application. The schematic embodiments and the description of the application are used to explain the same, and do not constitute an improper limitation to the application. In the drawings.

DETAILED DESCRIPTION

In order to make the purpose, technical solutions, and advantages of the application clearer, the technical solutions of the application will be described clearly and completely in combination with the specific embodiments of the application and the drawings. Obviously, the described embodiments are only part of the embodiments of the application, not all of them. Based on the embodiments in the application, all other embodiments obtained by those skilled in the field without creative work fall within the protection scope of the application.

At present, when optical properties of an object to be detected is measured using spatial frequency domain imaging, light emitted by a light source is usually modulated in a spatial frequency domain to form a structured light with a specified spatial frequency. Then the structured light is irradiated on the object to be detected, and a reflection image formed on the object to be detected is captured and analyzed with imaging technology, so as to obtain information such as the optical properties of the object to be detected. But, due to the limitation of measurement hardware, the measurement speed is slow and not ideal.

In related technologies, the light emitted by the light source is usually modulated into structured light with a large number of coded bits for measurement. However, due to the limitation of the hardware performance of the optical modulation device, it is slow for the optical modulation device to generate the structured light, thus affecting the measurement speed.

In order to solve the problems in the prior art, the embodiments of the application provide a method, device and system for optical property measurement method, device and system based on spatial frequency domain imaging. The solutions provided by the embodiments of the application can be applied to a spatial frequency domain imaging system with a light source, an optical modulation device, an imaging detection device, and a control device. Wherein the control device can control the optical modulation device to modulate the light emitted by the light source, and control the imaging detection device to collect reflection image data formed on the object to be detected, and to analyze the collected reflection image data, so as to achieve the purpose of obtaining the optical properties of the object to be detected and other information.

The technical solutions provided by each embodiment of the application is described in detail as follows in combination with the drawings.

Figure 1:
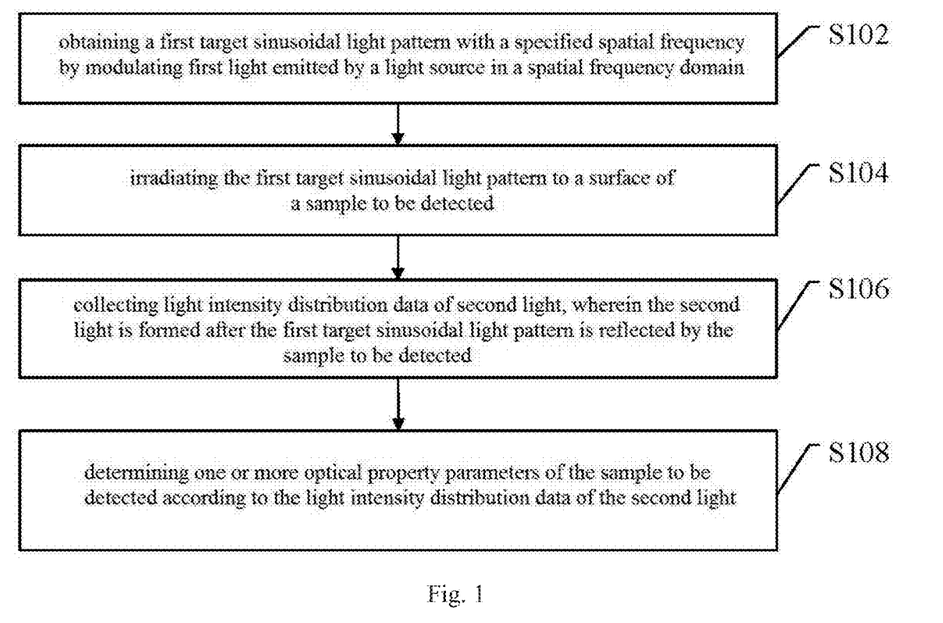
FIG. 1 is a schematic flowchart of a method for optical property measurement based on spatial frequency domain imaging provided by an exemplary embodiment of the application.

Refer to FIG. 1, which is a schematic flowchart of a method for optical property measurement based on spatial frequency domain imaging provided by an exemplary embodiment of the application. An executive subject of the method can be a control device in the spatial frequency domain imaging system described above. As illustrated in FIG. 1, the method can comprise the following steps:

S102, obtaining a first target sinusoidal light pattern with a specified spatial frequency by modulating first light emitted by a light source in a spatial frequency domain.

Wherein the first light refers to the light emitted by the light source when the one or more optical property parameters of a sample are measured.

The first target sinusoidal light pattern refers to the sinusoidal light pattern used to measure the one or more optical property parameters of the sample to be detected.

The specified spatial frequency can be preset according to actual needs. Considering that the sinusoidal optical signal with low spatial frequency has deeper penetration depth and higher signal-to-noise ratio in the object, in a more preferred solution, the specified spatial frequency can be set to a lower value, such as, but not limited to, combinations of 0 and 0.1 $mm^{-1}$, 0 and 0.2 $mm^{-1}$ and the like.

The number of coded bits of the first target sinusoidal light pattern is smaller than a preset number of bits, which can be set according to actual needs. Optionally, the preset number of bits is greater than or equal to 2 bits. Further, the applicant found through research that when 8-bit sinusoidal light pattern is modulated, the modulation speed is slow, which seriously affects the measurement speed. Based on this, in an optional solution, the preset number of bits can be set to 8 bits. Therefore, when modulating the light emitted by the light source in the spatial frequency domain, by modulating a sinusoidal light pattern less than 8 bits, the modulation speed can be improved, and thus measurement speed can be improved.

Figure 2A:
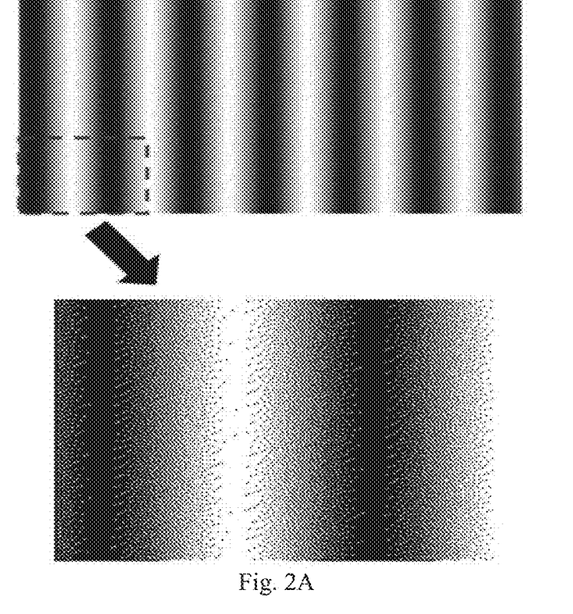
FIG. 2A is a schematic diagram of a first target sinusoidal light pattern with the number of coded bits being 1 bit provided by an exemplary embodiment of the application.

To further improve the measurement speed, in a more preferred solution, the number of coded bits of the first target sinusoidal light pattern is 1 bit. For example, FIG. 2A illustrates a schematic diagram of a first target sinusoidal light pattern with the number of coded bits being 1 bit.

The first target sinusoidal light pattern with the number of coded bits being 1 bit, is displayed as several stripes whose color depth varies from light to deep, and then from deep to light.

In a specific implementation, an optical modulation device can be controlled to modulate the first light emitted by the light source in the spatial frequency domain by controlling an optical modulation device to a first target sinusoidal light pattern with a specified spatial frequency. Wherein the optical modulation device can comprise, but is not limited to, at least one of the following devices: Digital Micromirror Device (DMD), or Spatial Light Modulator (SLM) and mask device. The DMD is a kind of optical switching, which uses a rotating mirror to realize the switching on or off of the optical switching, thus realizing the modulation of light in the spatial frequency domain; the SLM can change the amplitude (intensity), phase, polarization state, etc. of the spatial light distribution under the control of the time-varying electric driving signal or other signals, thus realizing the modulation of light in the spatial frequency domain; the mask device is to make the pattern simulating the sinusoidal change on the transparent material, after the light irradiating through the device, it can produce the illumination pattern with the intensity varying sinusoidally.

It should be noted that any suitable manner commonly used in the field can be used to modulate the first target sinusoidal light pattern in the spatial frequency domain using at least one of DMD, SLM, mask device and other devices, and will not be described in detail here.

S104, irradiating the first target sinusoidal light pattern to a surface of a sample to be detected.

S106, collecting light intensity distribution data of second light, wherein the second light is formed after the first target sinusoidal light pattern is reflected by the sample to be detected.

In an embodiment of the application, the light intensity distribution data of the light can comprise intensities of the light at different spatial locations. In practical application, the imaging detection device can be controlled to collect the light intensity distribution data of the second light. Wherein the imaging detection device can be a camera. It should be noted that any suitable manner for light intensity data collection commonly used in the field can be used to collect the light intensity distribution data of the second light by the imaging detection device, which will not be described in detail here.

S108, determining one or more optical property parameters of the sample to be detected according to the light intensity distribution data of the second light.

Specifically, after the first target sinusoidal light pattern is modulated, the optical modulation device can be controlled to irradiate the first target sinusoidal light pattern to the surface of the sample to be detected. After the first target sinusoidal light pattern irradiates to the surface of the sample to be detected, some photons are reflected by the surface of the sample to be detected, and some photons enter the interior of the sample to be detected and are absorbed and scattered, thus showing a corresponding light intensity distribution on the surface of the sample to be detected. Due to the different optical properties of different objects, the light intensity distribution results after reflecting the same first target sinusoidal light pattern are also different. Based on this, the optical properties of the sample to be detected can be analyzed according to the light intensity distribution data of the second light formed after the first target sinusoidal light pattern is reflected by the sample to be detected.

Figure 2B:
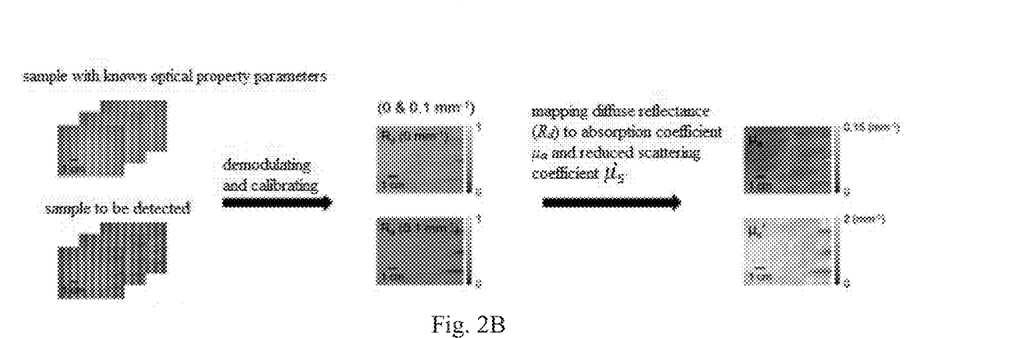
FIG. 2B is a schematic diagram of one or more optical property parameters of a sample to be detected provided by an exemplary embodiment of the application.

In an embodiment of the application, the one or more optical property parameters of the sample to be detected are parameters that can describe the optical properties of the sample to be detected, which can comprise, for example, but are not limited to, absorption coefficient $\mu_a$, scattering coefficient $\mu_s$, reduced scattering coefficient $\mu_s'$, diffuse reflectance $R_d$, etc. For example, FIG. 2B illustrates a schematic diagram of one or more optical property parameters of the sample to be detected, wherein the first column is the schematic diagram of the light intensity distribution data of the second light, the second column in the first row is the diffuse reflectance $R_d$ diagram of the sample to be detected at the spatial frequency of 0, the second column in the second row is the diffuse reflectance $R_d$ diagram of the sample to be detected at the spatial frequency of 0.1 mm$^{-1}$, the third column in the first row is the absorption coefficient $\mu_a$ diagram of the sample to be detected, and the third column in the second row is the reduced scattering coefficient $\mu_s'$ diagram of the sample to be detected.

In an embodiment of the application, the one or more optical property parameters of the sample to be detected can be used to further analyze the components of the sample to be detected. For example, the sample to be detected can be a biological tissue. Accordingly, the content and distribution of hemoglobin, blood oxygen, water, lipid, collagen and other information of the biological tissue can be measured according to the one or more optical property parameters of the biological tissue.

The technical solutions of the embodiments of the application adopted, i.e., obtaining a first target sinusoidal light pattern with a specified spatial frequency by modulating first light emitted by a light source in a spatial frequency domain, irradiating the first target sinusoidal light pattern to a surface of a sample to be detected, determining one or more optical property parameters of the sample to be detected by collecting light intensity distribution data of second light formed by reflection of the surface of the sample to be detected, compared with square wave pattern, is applicable to both high frequency spatial frequency measurement and low frequency spatial frequency measurement, and has a wider scope of application. In addition, the number of coded bits of the first target sinusoidal light pattern is smaller than the preset number of bits, which can improve the optical modulation speed, thereby effectively improve the measurement speed and rapidly improve the analysis efficiency of the sample to be detected.

In an embodiment, since the object has different responses to structured lights with different spatial frequencies, the optical properties of the object can be measured using multiple structured lights with different spatial frequencies. Specifically, the specified spatial frequency comprises at least two different spatial frequencies. Accordingly, the above step S104 comprising: irradiating the first target sinusoidal light pattern of at least one spatial frequency to a surface of a sample to be detected in turn. The above step S106 comprising: for the first target sinusoidal light pattern of each frequency, after irradiating the first target sinusoidal light pattern to the surface of the sample to be detected, collecting light intensity distribution data of a second light (that is, the light formed after the first target sinusoidal light pattern is reflected by the surface of the sample to be detected) corresponding to the first target sinusoidal light pattern. The above step S108 comprising: determining one or more optical property parameters of the sample to be detected according to the light intensity distribution data of the second light corresponding to the first target sinusoidal light pattern of the at least one spatial frequency.

It should be noted that, the specific implementation of determining the one or more optical property parameters according to the light intensity distribution data of the reflected light corresponding to the sinusoidal light pattern of at least one spatial frequency, can adopt any suitable implementation manner commonly used in the field, and will not be described in detail here.

It can be understood that in this embodiment, using the first target sinusoidal light pattern of at least one spatial frequency to measure the optical properties of the sample to be detected, can better suppress noise interference, and thus improve the accuracy of the measurement results.

In another embodiment, since the object has different responses to structured lights with different phases, the optical properties of the object can be measured using multiple structured lights with different phases. Specifically, the first target sinusoidal light pattern of the specified spatial frequency comprises a first target sinusoidal light pattern of at least one phase of the specified spatial frequency. Accordingly, the above step S104 comprising: irradiating the first target sinusoidal light pattern of at least one phase to a surface of a sample to be detected in turn. The above step S106 comprising: for the first target sinusoidal light pattern of each phase, after irradiating the first target sinusoidal light pattern to the surface of the sample to be detected, collecting light intensity distribution data of a second light (that is, the light formed after the first target sinusoidal light pattern is reflected by the surface of the sample to be detected) corresponding to the first target sinusoidal light pattern. The above step S108 comprising: determining one or more optical property parameters of the sample to be detected based on the light intensity distribution data of the second light corresponding to the first target sinusoidal light pattern of the at least one phase.

More specifically, for the above step S108, in an optional implementation, the light intensity distribution data of the second light corresponding to the first target sinusoidal light pattern of the at least one phase, can be input into a pre-established neural network model to obtain one or more optical property parameters of the sample to be detected, wherein the neural network model is trained and obtained by taking the light intensity distribution data, which is obtained by irradiating at least one first target sinusoidal light pattern with the specified spatial frequency onto a sample with known optical property parameters, as training samples, and using the optical property parameters of the sample as labels.

For the above step S108, in another optional implementation, it is also possible to obtain a DC component and a AC component by demodulating the light intensity distribution data of the second light corresponding to the first target sinusoidal light pattern of at least one phase, and further determine one or more optical property parameters of the sample to be detected based on the obtained DC component and AC component.

It should be noted that, the above specific implementation of determining optical property measurement of the sample to be detected by using the first target sinusoidal light pattern of at least one phase, can adopt any suitable implementation manner commonly used in the field, such as three-phase shift method, four-phase shift method, etc., which will not be detailed here.

It can be understood that in this embodiment, measuring the optical properties of the sample to be detected by using the sinusoidal light pattern of at least one phase is simple to achieve and further improves the measurement speed.

Further, when the optical modulation device is controlled to modulate the first light emitted by the light source in the spatial frequency domain, the change of light source intensity, fluctuation of measuring device and other factors may lead to that the first target sinusoidal light patterns modulated for the same sample measurement at different times may also be different, which affects the accuracy of subsequent measurement results. Based on this, in another embodiment, before the above step S102, the above method further comprises the step of calibrating the spatial frequency domain imaging system.

Specifically, firstly, an optical modulation device can be controlled to obtain a second target sinusoidal light pattern with a specified spatial frequency by modulating third light emitted by the light source in the spatial frequency domain, wherein the third light is the light emitted by the light source when measuring a sample with known optical property parameters; the second target sinusoidal light pattern can be the same as or different from the first target sinusoidal light pattern; next, the optical modulation device can be controlled to irradiate the second target sinusoidal light pattern to a surface of the sample with known optical property parameters; and then, light intensity distribution data of fourth light is collected, wherein the fourth light is formed after the second target sinusoidal light pattern is reflected by the sample, for example, the first column in the first row of FIG. 2B illustrates a schematic diagram of the light intensity distribution data of the fourth light collected; finally, the optical modulation device is calibrated according to the light intensity distribution data of the fourth light.

It should be noted that the specific implementation of calibrating the optical modulation device according to the light intensity distribution data of the fourth light, can adopt any suitable implementation manner commonly used in the field, and will not be described in detail here.

Figure 3:
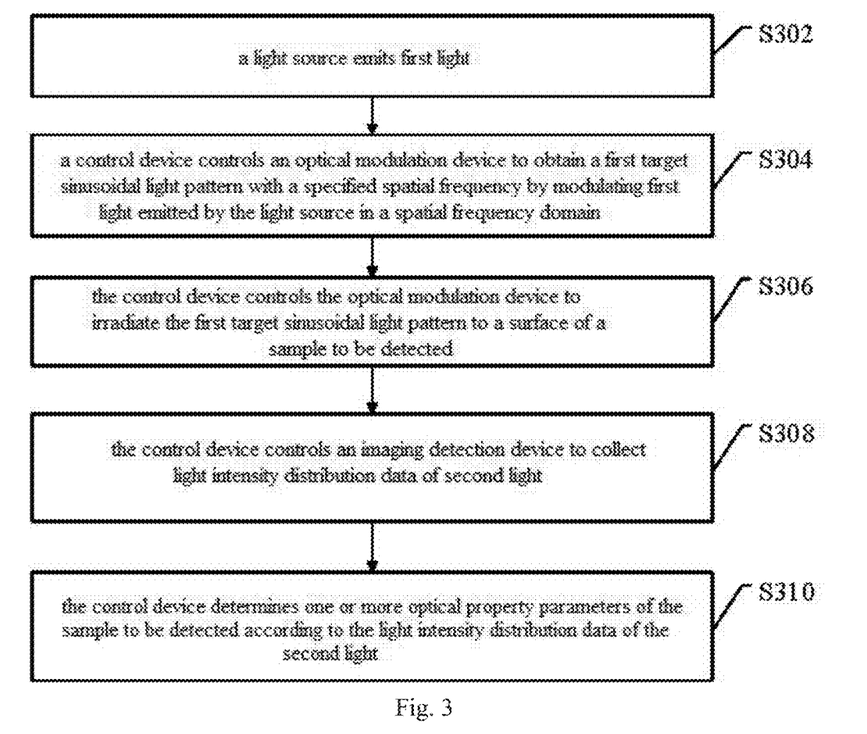
FIG. 3 is a schematic flowchart of a method for optical property measurement based on spatial frequency domain imaging provided by another exemplary embodiment of the application.

Refer to FIG. 3, which illustrates a schematic flowchart of a method for optical property measurement based on spatial frequency domain imaging provided by another exemplary embodiment of the application, the method can be applied to the spatial frequency domain imaging system described above. As illustrated in FIG. 3, the method can comprise the following steps:

S302, a surveyor places a sample to be detected on a stage and turns on a light source, which emits first light.

S304, a control device controls an optical modulation device to modulate the first light emitted by the light source in the spatial frequency domain to obtain a first target sinusoidal light pattern with a specified spatial frequency.

Wherein, the number of coded bits of the first target sinusoidal light pattern is smaller than a preset number of bits.

S306, the control device controls the optical modulation device to irradiate the first target sinusoidal light pattern to a surface of a sample to be detected.

The first target sinusoidal light pattern is reflected on the surface of the sample to be detected, and second light is formed after reflection of the sample to be detected.

S308, the control device controls an imaging detection device to collect light intensity distribution data of the second light.

S310, the control device determines one or more optical property parameters of the sample to be detected according to the light intensity distribution data of the second light.

It should be noted that the specific implementations of the above steps can refer to the technical details detailed in the above embodiments. To avoid redundancy, it will not be described in detail here.

The technical solutions of the embodiments of the application adopted, i.e., obtaining a first target sinusoidal light pattern with a specified spatial frequency by modulating first light emitted by a light source in a spatial frequency domain, irradiating the first target sinusoidal light pattern to a surface of a sample to be detected, determining one or more optical property parameters of the sample to be detected by collecting light intensity distribution data of second light formed by reflection of the surface of the sample to be detected, compared with square wave pattern, is applicable to both high frequency spatial frequency measurement and low frequency spatial frequency measurement, and has a wider scope of application. In addition, the number of coded bits of the first target sinusoidal light pattern is smaller than the preset number of bits, which can improve the optical modulation speed, thereby effectively improve the measurement speed and rapidly improve the analysis efficiency of the sample to be detected.

It should be noted that the specific embodiments of this specification are described above. Other embodiments are within the scope of the appended claims. In some cases, the actions or steps recorded in the claims may be performed in a sequence different from that in the embodiments and the desired results may still be achieved. In addition, the process depicted in the drawings does not necessarily require a particular order or a sequential order illustrated to achieve the desired result. In some embodiments, multitasking and parallel processing are also possible or may be advantageous.

Figure 4:
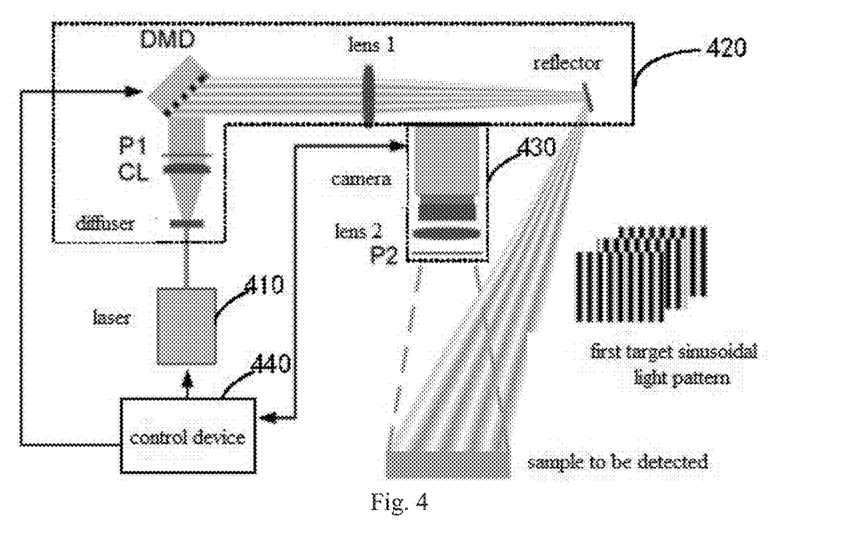
FIG. 4 is a structural schematic diagram of a system for optical property measurement based on spatial frequency domain imaging provided by an exemplary embodiment of the application.

The above is the method for optical property measurement based on spatial frequency domain imaging provided by the embodiments of the application. Based on the same idea, the embodiments of the application also provide a system for optical property measurement based on spatial frequency domain imaging. Refer to FIG. 4, which illustrates a structural schematic diagram of a system for optical property measurement based on spatial frequency domain imaging provided by an exemplary embodiment of the application, the system comprises: a light source 410, an optical modulation device 420, an imaging detection device 430 and a control device 440. Wherein, the optical modulation device 420 and the imaging detection device 430 are respectively connected with the control device 440.

Wherein, the light source 410 is configured to emit light.

The optical modulation device 420 is configured to obtain a first target sinusoidal light pattern with a specified spatial frequency by modulating first light emitted by a light source in a spatial frequency domain, and to irradiate the first target sinusoidal light pattern to a surface of a sample to be detected, the number of coded bits of the first target sinusoidal light pattern is smaller than a preset number of bits.

The imaging detection device 430 is configured to collect light intensity distribution data of second light, the second light is formed after the first target sinusoidal light pattern is reflected by the sample to be detected.

The control device 440 is configured to control the operation of the optical modulation device and the imaging detection device, and to determine one or more optical property parameters of the sample to be detected according to the light intensity distribution data of the second light.

In an embodiment of the application, the light source 410 can be any suitable device capable of emitting light, and the type of the light source 410 in the embodiment of the application is not specifically defined. In an embodiment, the light source 410 can comprise a laser.

In an embodiment of the application, the optical modulation device 420 can be any suitable device capable of modulating light in the spatial frequency domain, and the type of the optical modulation device 420 in the embodiment of the application is not specifically defined. In an embodiment, the optical modulation device 420 can comprise, but not limited to, at least one of the following devices: Digital Micromirror Device (DMD), Spatial Light Modulator (SLM) and mask device. Further, in order to ensure the modulation effect of light, the optical modulation device 420 can also comprise any other suitable optical devices, such as diffuser, optics P1 and CL, lens 1, and reflector, which can be set according to actual needs.

In an embodiment of the application, the imaging detection device 430 can be any suitable device with image data collecting function, and the type of the imaging detection device 430 in the embodiment of the application is not specifically defined. In an embodiment, the imaging detection device 430 can comprise a camera. Further, in order to ensure the accuracy of the collected imaging data, the imaging detection device 430 can also comprise any other suitable optical devices, such as lens 2, optics P2, etc., which can be set according to actual needs.

In an embodiment of the application, the control device 440 can be any suitable device with control and data processing functions, such as a computer.

In one embodiment, the preset number of bits is 8 bits.

In one embodiment, the number of coded bits of the first target sinusoidal light pattern is 1 bit.

In one embodiment, the first target sinusoidal light pattern with specified spatial frequency comprises a first target sinusoidal light pattern with at least two different spatial frequencies.

The control device 440 irradiates a first target sinusoidal light pattern of at least one spatial frequency to a surface of a sample to be detected in turn, and for the first target sinusoidal light pattern of each frequency, after irradiating the first target sinusoidal light pattern to the surface of the sample to be detected, controls the imaging detection device 430 to collect light intensity distribution data of second light corresponding to the first target sinusoidal light pattern; and then determines one or more optical property parameters of the sample to be detected according to the light intensity distribution data of the second light corresponding to the first target sinusoidal light pattern of the at least one spatial frequency.

In one embodiment, the first target sinusoidal light pattern with the specified spatial frequency comprises a first target sinusoidal light pattern of at least one phase with the specified spatial frequency. The control device 440 irradiates the first target sinusoidal light pattern of the at least one phase to a surface of a sample to be detected in turn, and for the first target sinusoidal light pattern of each phase, after irradiating the first target sinusoidal light pattern to the surface of the sample to be detected, controls the imaging detection device 430 to collect light intensity distribution data of second light corresponding to the first target sinusoidal light pattern; and then determines one or more optical property parameters of the sample to be detected according to the light intensity distribution data of the second light corresponding to the first target sinusoidal light pattern of the at least one phase.

Optionally, before the control device 440 controls the optical modulation device to modulate the first light emitted by the light source in the spatial frequency domain, the control device 440 further controls the optical modulation device 420 to modulate third light emitted by the light source in the spatial frequency domain, to obtain a second target sinusoidal light pattern with a specified spatial frequency, and the control device 440 controls the optical modulation device 420 to irradiate the second target sinusoidal light pattern to a surface of a sample with known optical property parameters; and then the control device 440 controls the imaging detection device 430 to collect light intensity distribution data of fourth light, and to calibrate the optical modulation device according to the light intensity distribution data of the fourth light, wherein the fourth light is formed after the second target sinusoidal light pattern is reflected by the sample.

The system for optical property measurement based on spatial frequency domain imaging provided by the embodiments of the application adopted, i.e., obtaining a first target sinusoidal light pattern with a specified spatial frequency by modulating first light emitted by a light source in a spatial frequency domain, irradiating the first target sinusoidal light pattern to a surface of a sample to be detected, determining one or more optical property parameters of the sample to be detected by collecting light intensity distribution data of second light formed by reflection of the surface of the sample to be detected, compared with square wave pattern, is applicable to both high frequency spatial frequency measurement and low frequency spatial frequency measurement, and has a wider scope of application. In addition, the number of coded bits of the first target sinusoidal light pattern is smaller than the preset number of bits, which can improve the optical modulation speed, thereby effectively improve the measurement speed and rapidly improve the analysis efficiency of the sample to be detected.

Figure 5:
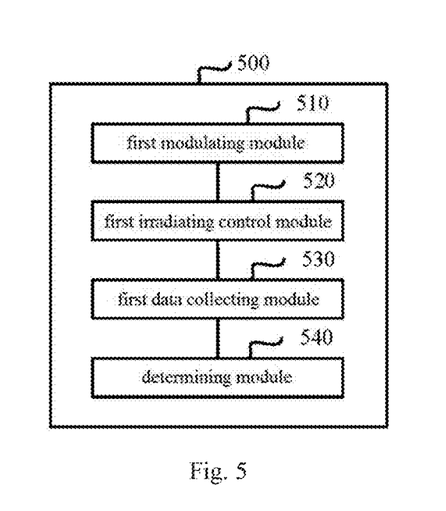
FIG. 5 is a structural schematic diagram of a device for optical property measurement based on spatial frequency domain imaging provided by an exemplary embodiment of the application.

Based on the same idea, the embodiments of the application also provide a device for optical property measurement based on spatial frequency domain imaging. Refer to FIG. 5, which illustrates a structural schematic diagram of a device 500 for optical property measurement based on spatial frequency domain imaging provided by an exemplary embodiment of the application, the device comprises:

a first modulating module 510, configured to obtain a first target sinusoidal light pattern with a specified spatial frequency by modulating first light emitted by a light source in a spatial frequency domain, the number of coded bits of the first target sinusoidal light pattern is smaller than a preset number of bits;

a first irradiating control module 520, configured to irradiate the first target sinusoidal light pattern to a surface of a sample to be detected;

a first data collecting module 530, configured to collect light intensity distribution data of second light, the second light is formed after the first target sinusoidal light pattern is reflected by the sample to be detected;

a determining module 540, configured to determine one or more optical property parameters of the sample to be detected according to the light intensity distribution data of the second light.

In one embodiment, the preset number of bits is 8 bits.

In one embodiment, the number of coded bits of the first target sinusoidal light pattern is 1 bit.

In one embodiment, the first target sinusoidal light pattern with the specified spatial frequency comprises a plurality of first target sinusoidal light patterns with different spatial frequencies.

The irradiating control module 520 comprises:

a first irradiating sub-module, configured to irradiate a first target sinusoidal light pattern of at least one spatial frequency to a surface of a sample to be detected in turn.

The first data collecting module 530 comprises:

a first collecting sub-module, configured to, for the first target sinusoidal light pattern of each frequency, after irradiating the first target sinusoidal light pattern to the surface of the sample to be detected, collect light intensity distribution data of second light corresponding to the first target sinusoidal light pattern.

The determining module 540 comprises:

a first determining sub-module, configured to determine one or more optical property parameters of the sample to be detected according to the light intensity distribution data of the second light corresponding to the first target sinusoidal light pattern of the at least one spatial frequency.

In one embodiment, the first target sinusoidal light pattern with the specified spatial frequency comprising a first target sinusoidal light pattern of at least one phase with the specified spatial frequency.

The first irradiating control module 520 comprises:

a second irradiating sub-module, configured to irradiate the first target sinusoidal light pattern of the at least one phase to a surface of a sample to be detected in turn.

The first data collecting module 530 comprises:

a second collecting sub-module, configured to, for the first target sinusoidal light pattern of each phase, after irradiating the first target sinusoidal light pattern to the surface of the sample to be detected, collect light intensity distribution data of second light corresponding to the first target sinusoidal light pattern.

The determining module 540 comprises:

a second determining sub-module, configured to determine one or more optical property parameters of the sample to be detected according to the light intensity distribution data of the second light corresponding to the first target sinusoidal light pattern of the at least one phase.

In one embodiment, the first modulating module 510 comprises:

a modulating sub-module, configured to control an optical modulation device to modulate the first light emitted by the light source in the spatial frequency domain.

The device 500 further comprises:

a second modulating module, configured to, before the first modulating sub-module controls the optical modulation device to modulate the first light emitted by the light source in the spatial frequency domain, control the optical modulation device to modulate third light emitted by the light source in the spatial frequency domain, to obtain a second target sinusoidal light pattern with a specified spatial frequency;

a second irradiating control module, configured to control the optical modulation device to irradiate the second target sinusoidal light pattern to a surface of a sample with known optical property parameters;

a second data collecting module, configured to collect light intensity distribution data of fourth light, the fourth light is formed after the second target sinusoidal light pattern is reflected by the sample;

a calibrating module, configured to calibrate the optical modulation device according to the light intensity distribution data of the fourth light.

It should be understood by those skilled in the field that the device for optical property measurement based on spatial frequency domain imaging illustrated in FIG. 5, can be used to implement the method for optical property measurement based on spatial frequency domain imaging described above, and the detailed description therein should be similar to the description in the method above. To avoid redundancy, it will not be described in detail here.

The device for optical property measurement based on spatial frequency domain imaging provided by the embodiments of the application adopted, i.e., obtaining a first target sinusoidal light pattern with a specified spatial frequency by modulating first light emitted by a light source in a spatial frequency domain, irradiating the first target sinusoidal light pattern to a surface of a sample to be detected, determining one or more optical property parameters of the sample to be detected by collecting light intensity distribution data of second light formed by reflection of the surface of the sample to be detected, compared with square wave pattern, is applicable to both high frequency spatial frequency measurement and low frequency spatial frequency measurement, and has a wider scope of application. In addition, the number of coded bits of the first target sinusoidal light pattern is smaller than the preset number of bits, which can improve the optical modulation speed, thereby effectively improve the measurement speed and rapidly improve the analysis efficiency of the sample to be detected.

Figure 6:
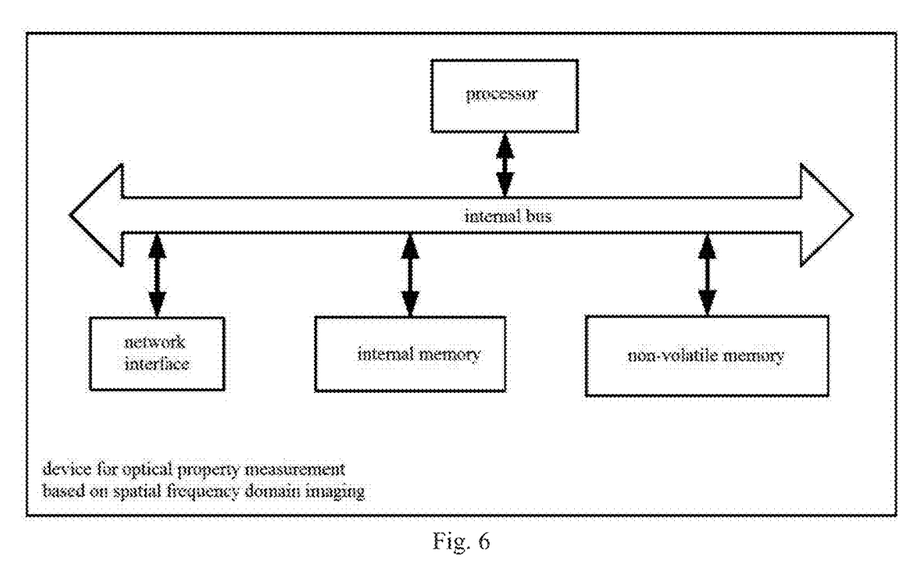
FIG. 6 is a structural schematic diagram of a device for optical property measurement based on spatial frequency domain imaging provided by an exemplary embodiment of the application.

Based on the same idea, the embodiments of the application also provide a device for optical property measurement based on spatial frequency domain imaging. Refer to FIG. 6, which illustrates a structural schematic diagram of a device for optical property measurement based on spatial frequency domain imaging provided by an exemplary embodiment of the application. As illustrated in FIG. 6, at the hardware level, the device comprises a processor, optionally an internal bus, a network interface, and a storage. Wherein the storage may comprise an internal memory, such as a high-speed random access memory (RAM), or a non-volatile memory, such as at least one disk storage. Of course, the device may also comprise hardware required by other services.

The processor, network interface and storage can be connected with each other through an internal bus, which can be an Industry Standard Architecture (ISA) bus, a Peripheral Component Interconnect (PCI) bus or an Extended Industry Standard Architecture (EISA) bus. The bus can be divided into address bus, data bus, control bus, etc. For the convenience of representation, only one bidirectional arrow is used to represent the bus illustrated in FIG. 6, but it does not mean that there is only one bus or one type of bus.

The storage is used for storing a program. Specifically, the program may comprise program code, which comprises computer operation instructions. The storage may comprise an internal memory and a non-volatile memory, and provide instructions and data to the processor.

The processor reads a corresponding computer program from the non-volatile memory into the internal memory and then runs it, forming a device for optical property measurement based on spatial frequency domain imaging on the logic level. The processor executes the program stored in the storage and is specifically used to perform the following operations:

obtaining a first target sinusoidal light pattern with a specified spatial frequency by modulating first light emitted by a light source in a spatial frequency domain, the number of coded bits of the first target sinusoidal light pattern is smaller than the preset number of bits;

irradiating the first target sinusoidal light pattern to a surface of a sample to be detected;

collecting light intensity distribution data of second light, the second light is formed after the first target sinusoidal light pattern is reflected by the sample to be detected;

determining one or more optical property parameters of the sample to be detected according to the light intensity distribution data of the second light.

The method disclosed in the embodiment illustrated in FIG. 1 of the application and performed by the device for optical property measurement based on spatial frequency domain imaging can be applied to or implemented by a processor. The processor may be an integrated circuit chip with signal processing capability. In an implementation process, each step of the above method can be completed by an integrated logic circuit of hardware in the processor or instructions in form of software. The above processor can be general-purpose processors, comprising central processing unit (CPU), network processor (NP), etc.; it can also be digital signal processor (DSP), application specific integrated circuit (ASIC), field programmable gate array (FPGA) or other programmable logic devices, discrete gates or transistor logic devices, discrete hardware components. Each method, step and logic block diagram disclosed in the embodiments of the application can be implemented or executed. The general-purpose processor may be a microprocessor or the processor may also be any conventional processor or the like. The steps of the method disclosed in connection with the embodiments of the application can be directly embodied as completion and execution of hardware decoding processor, or as a combination of hardware and software modules in the decoding processor. Software modules can be located in RAM, flash memory, read-only memory, programmable read-only memory or electrically erasable programmable memory, registers and other mature storage media in the field. The storage medium is located in the storage, and the processor reads information in the storage and completes the steps of the above method in combination with its hardware.

The device can also implement the method of FIG. 1, and realize the functions of a device for optical property measurement based on spatial frequency domain imaging in the embodiment illustrated in FIG. 1. The embodiments of the application will not be described here.

Of course, in addition to the software implementation manner, the device of the application does not exclude other implementation manners, such as logic devices or a combination of software and hardware, etc. That is to say, the execution subject of the following processing flow is not limited to each logic unit, but can also be hardware or logic devices.

The embodiments of the present application also propose a computer-readable storage medium, which stores one or more programs. The one or more programs comprise instructions, which, when executed by a portable device comprising a plurality of application programs, enable the portable device to perform the method of the embodiment illustrated in FIG. 1, and are specifically used to perform the following operations:

obtaining a first target sinusoidal light pattern with a specified spatial frequency by modulating first light emitted by a light source in a spatial frequency domain, the number of coded bits of the first target sinusoidal light pattern is smaller than a preset number of bits;

irradiating the first target sinusoidal light pattern to a surface of a sample to be detected;

collecting light intensity distribution data of second light, the second light is formed after the first target sinusoidal light pattern is reflected by the sample to be detected;

determining one or more optical property parameters of the sample to be detected according to the light intensity distribution data of the second light.

In conclusion, the above description only refers to preferred embodiments of the application and is not intended to limit the protection scope of the application. Any modification, equivalent replacement, improvement, etc. made within the spirit and principles of the application shall be included in the protection scope of this application.

The system, device, module or unit described in the above embodiments can be specifically implemented by a computer chip or entity, or by a product with a certain function. A typical implementation device is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or any combination of these devices.

Computer-readable media, including permanent and non-permanent, removable and non removable media, may realize information storage by any method or technology. The information may be computer-readable instructions, data structures, modules of programs, or other data. Examples of computer storage media comprises, but are not limited to, Phased Random Access Storage (PRAM), Static Random Access Storage (SRAM), Dynamic Random Access Storage (DRAM), other types of Random Access Storage (RAM), Read-only Memory (ROM), Electrically Erasable Programmable Read-Only Storage (EEPROM), Flash Memory or other memory technologies, Compact Disc-Read-Only Storage (CD-ROM), Digital Video Disc (DVD), or other optical storage, magnetic cassette tape, magnetic tape magnetic disk storage or other magnetic storage devices or any other non-transmission medium, which can be used to store information that can be accessed by computing devices. As defined herein, the computer-readable media do not comprise transitory media, such as modulated data signals and carrier waves.

It should also be noted that the terms "include", "comprise" or any other variant thereof are intended to cover non-exclusive inclusion, so that a process, method, article or apparatus including not only those elements, but also other elements that are not explicitly listed, or elements inherent in such process, method, article or apparatus. Without further restrictions, the elements defined by the statement "comprise a . . . " do not exclude the existence of other identical elements in the process, method, article or apparatus including the elements.

Each embodiment in this specification is described in a progressive manner. The same and similar parts of each embodiment can be referred to each other. Each embodiment focuses on the differences with other embodiments. In particular, for the system embodiment, since it is basically similar to the method embodiment, so it is described briefly, the correlation can refer to the description of the method embodiment.

The invention claimed is:

1. A method for optical property measurement based on spatial frequency domain imaging, comprising:
  obtaining a first target sinusoidal light pattern with a specified spatial frequency by modulating first light emitted by a light source in a spatial frequency domain, the number of coded bits of the first target sinusoidal light pattern is smaller than a preset number of bits, wherein the preset number of bits is greater than or equal to 2 bits, and the number of coded bits of the first target sinusoidal light pattern is 1 bit;
  irradiating the first target sinusoidal light pattern to a surface of a sample to be detected;
  collecting light intensity distribution data of second light, the second light is formed after the first target sinusoidal light pattern is reflected by the sample to be detected; and
  determining one or more optical property parameters of the sample to be detected according to the light intensity distribution data of the second light.

2. The method according to claim 1, wherein the specified spatial frequency comprises at least two different spatial frequencies;
  irradiating the first target sinusoidal light pattern to a surface of a sample to be detected comprises:
    irradiating a first target sinusoidal light pattern of at least one spatial frequency to a surface of a sample to be detected in turn;
  collecting light intensity distribution data of second light comprises:
    for the first target sinusoidal light pattern of each frequency, after irradiating the first target sinusoidal light pattern to the surface of the sample to be detected, collecting light intensity distribution data of second light corresponding to the first target sinusoidal light pattern;
  determining one or more optical property parameters of the sample to be detected according to the light intensity distribution data of the second light comprises:
    determining one or more optical property parameters of the sample to be detected according to the light intensity distribution data of the second light corresponding to the first target sinusoidal light pattern of the at least one spatial frequency.

3. The method according to claim 1, wherein the first target sinusoidal light pattern with the specified spatial frequency comprises a first target sinusoidal light pattern of at least one phase with the specified spatial frequency;
  irradiating the first target sinusoidal light pattern to a surface of a sample to be detected comprises:
    irradiating a first target sinusoidal light pattern of the at least one phase to a surface of a sample to be detected in turn;
  collecting light intensity distribution data of second light comprises:
    for the first target sinusoidal light pattern of each phase, after irradiating the first target sinusoidal light pattern to the surface of the sample to be detected, collecting light intensity distribution data of second light corresponding to the first target sinusoidal light pattern;
  determining one or more optical property parameters of the sample to be detected according to the light intensity distribution data of the second light comprises:
    determining one or more optical property parameters of the sample to be detected according to the light intensity distribution data of the second light corresponding to the first target sinusoidal light pattern of the at least one phase.

4. The method according to claim 1, wherein modulating first light emitted by a light source in a spatial frequency domain comprises:
  controlling an optical modulation device to modulate first light emitted by a light source in a spatial frequency domain;
  before controlling an optical modulation device to modulate first light emitted by a light source in a spatial frequency domain, the method further comprises:
    obtaining a second target sinusoidal light pattern with a specified spatial frequency by controlling the optical modulation device to modulate third light emitted by the light source in the spatial frequency domain,
    irradiating the second target sinusoidal light pattern to a surface of a sample with known optical property parameters by controlling the optical modulation device;
  collecting light intensity distribution data of fourth light, the fourth light is formed after the second target sinusoidal light pattern is reflected by the sample;

calibrating the optical modulation device according to the light intensity distribution data of the fourth light.

5. A device for optical property measurement based on spatial frequency domain imaging, comprising: a storage and a processor electrically connected with the storage, the storage stores a computer program that can be run on the processer, the computer program, when executed by the processor, performs the steps of the method according to claim 1.

6. A system for optical property measurement based on spatial frequency domain imaging, comprising:
- a light source, configured to emit light;
- an optical modulation device, configured to obtain a first target sinusoidal light pattern with a specified spatial frequency by modulating first light emitted by the light source in a spatial frequency domain, and to irradiate the first target sinusoidal light pattern to a surface of a sample to be detected, the number of coded bits of the first target sinusoidal light pattern is smaller than a preset number of bits, wherein the preset number of bits is greater than or equal to 2 bits, and the number of coded bits of the first target sinusoidal light pattern is 1 bit;
- an imaging detection device, configured to collect light intensity distribution data of second light, the second light is formed after the first target sinusoidal light pattern is reflected by the sample to be detected;
- a control device, respectively connected with the optical modulation device and the imaging detection device, configured to control the operation of the optical modulation device and the imaging detection device, and to determine one or more optical property parameters of the sample to be detected according to the light intensity distribution data of the second light.

7. The system according to claim 6, wherein the optical modulation device comprises at least one of the following devices: Digital Micromirror Device (DMD), Spatial Light Modulator (SLM) and mask device.

\* \* \* \* \*